Nov. 6, 1934.  W. G. WOLFE  1,980,147
LENS SYSTEM
Filed March 19, 1932   2 Sheets-Sheet 1
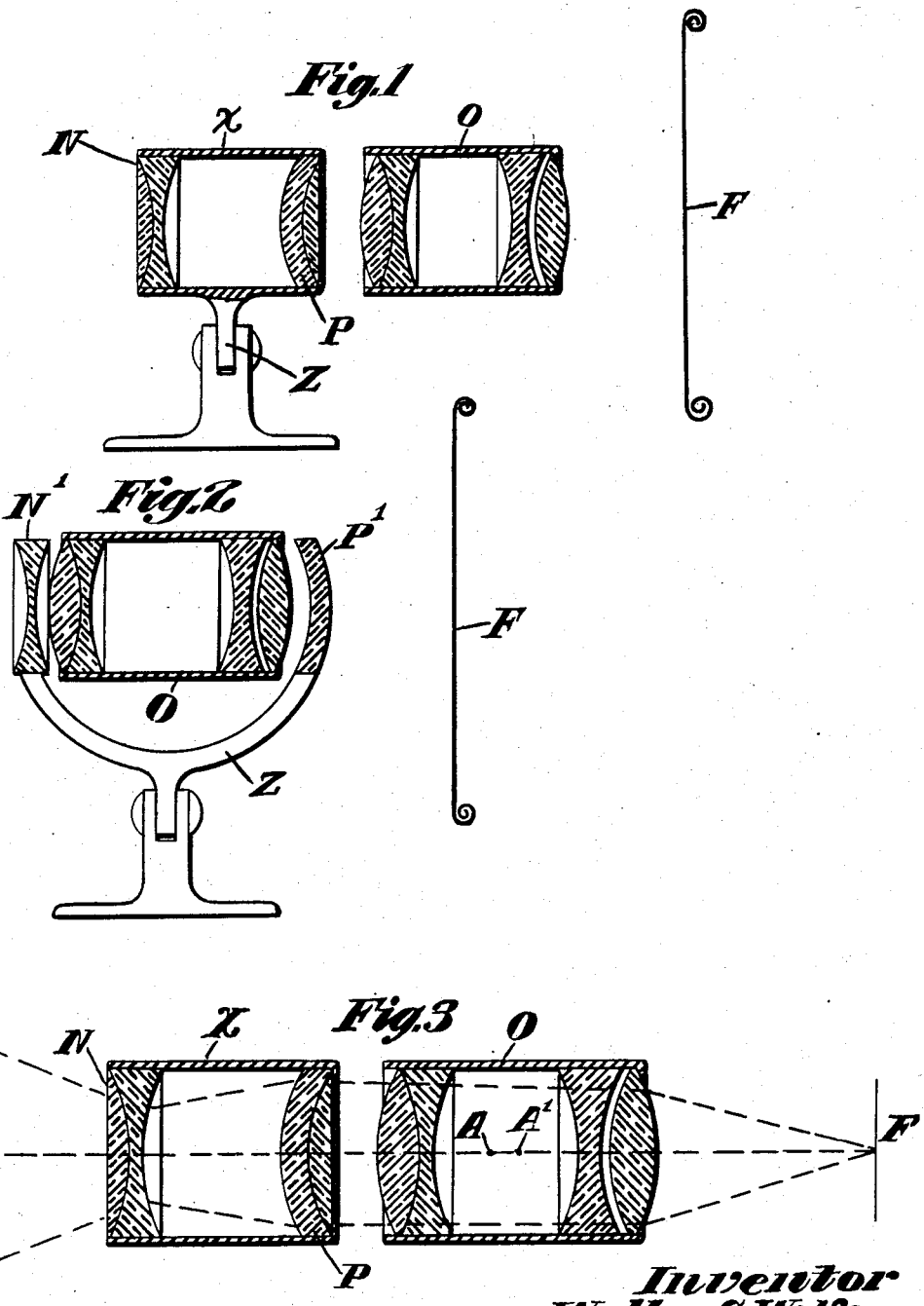
Inventor
Walter G. Wolfe
By Attorney Nov. 6, 1934.  W. G. WOLFE  1,980,147
LENS SYSTEM
Filed March 19, 1932  2 Sheets-Sheet 2
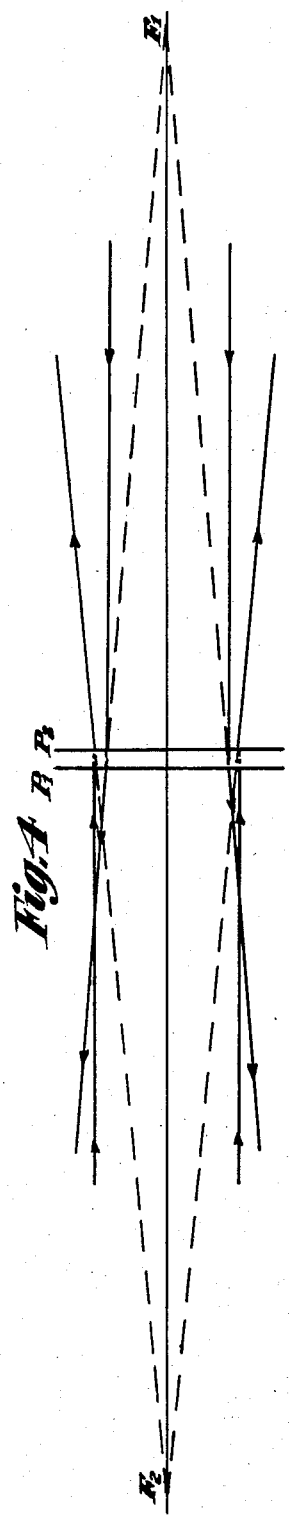
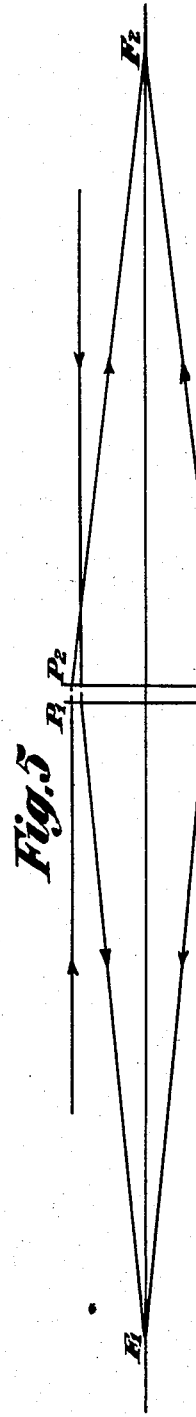
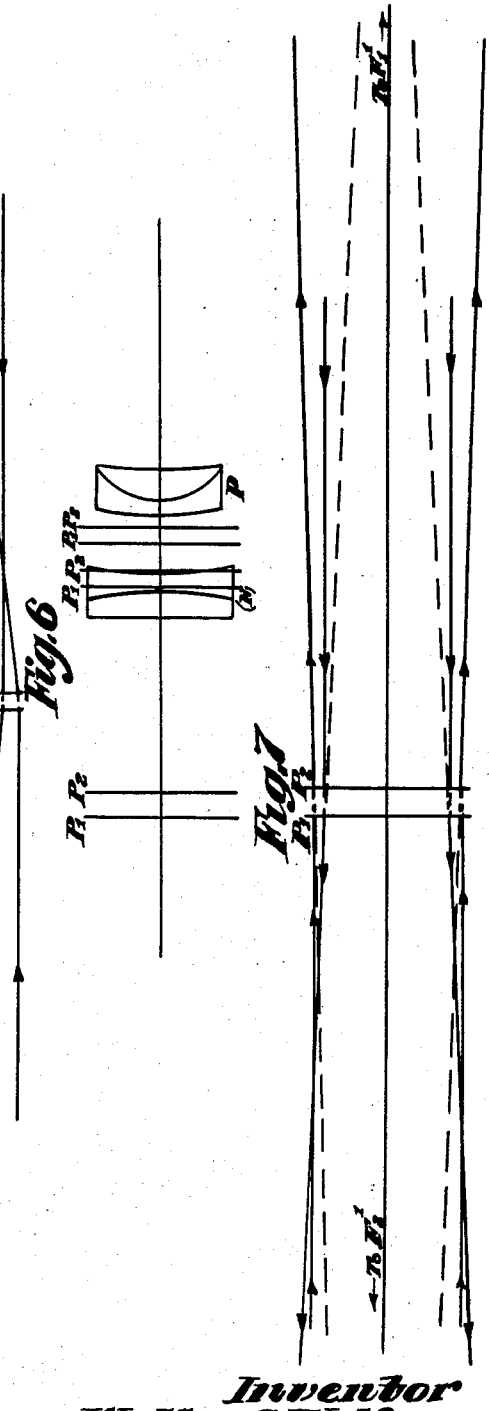
Inventor
Walter G. Wolfe
By Otis Spear Jr.
Attorney Patented Nov. 6, 1934

1,980,147

UNITED STATES PATENT OFFICE 1,980,147

LENS SYSTEM

Walter G. Wolfe, Greenwood, Mass., assignor to Wilmot R. Evans, trustee, Boston, Mass.

Application March 19, 1932, Serial No. 599,907

5 Claims. (Cl. 88—24)

The subject matter of the present case involves wide angle optics and particularly auxiliary lenses or lens systems used in combination with another lens or lens systems for increasing the field in photography or projection.

The immediate importance of this is well indicated in both the filming of moving pictures and their projection. It not only makes possible a more inclusive field for a standard size film, but it may be used to equalize or make uniform the screen intercept from films of different image size, or to cover an enlarged area as where an auxiliary screen is unfolded.

For example, in either photography or projection it is often desired to take or project pictures of widened angle or greater inclusion. In the projection of the talking movie in alternation with the usual film, there is an actual difference in the size of the film exposure to be projected. The so-called talkie movie is at least one-tenth smaller in image area and in changing from one type of film to the other the picture or screen intercept is correspondingly of different size. This is objectionable for many reasons and some means of equalizing has been much needed.

It has been proposed to do this but such proposals involved re-focusing, and re-focusing is impracticable in operation for various reasons. In accordance with my invention the shift in angular range may be effected without re-focusing or other delay. In general my invention contemplates a negative system consisting of a negative element and a positive element of given specification and separated by a given distance. This negative system to be placed before any of the usual different positive projectors. The distance at which this negative system is to be placed from the projector with which it is used will depend upon the characteristics of the projector.

As illustrative of my invention I show in the accompanying drawings optics which accomplish the desired results. In these drawings:

Fig. 1 illustrates a supplementary lens system in a combination adapted to change the angular spread of an ordinary lens system without materially affecting its back focus.

Fig. 2 shows a modified form.

Fig. 3 is a briefed diagram of the performance of the system.

Fig. 4 is a diagrammatic indication of the optical functions of the negative element.

Fig. 5 is a similar treatment of the positive element.

Fig. 6 is a diagram of the optical elements placed as to principal planes, and

Fig. 7 a graphic indication of the effect of the system.

In these drawings I have attempted to illustrate diagrammatically a system in which the film is indicated at F and the usual optics at O. For the purposes of the present discussion these may be considered as a projection system.

The modifying element as shown is indicated generally at X. As shown it consists in a positive member P and a negative member N. The usual lens system O provides for the normal magnification of the images of the film F. The element X provides for supplemental magnification as desired. The problem as before stated is to provide increased magnification without change of back focus.

To accomplish this in the form shown I make the positive P and a negative N of substantial neutralizing effect, although in practice I make the positive somewhat weaker. For example, I may make the lens P+1.96 dioptric and N—2.25 dioptric.

Ordinarily this would be supposed to result in $a$—0.29. Moreover, this would normally affect the back focus to such an extent that re-focusing would be necessary. I avoid this difficulty by spacing the lenses N and P, as will be hereafter described, and by so doing in effect shorten the focal length of the system O to give the required magnification without shortening or adding to its existing back focal distance. This special effect of shortening the focal length of the positive projector system O without materially changing its back focus is produced by the particular position of the particular negative system with reference to the projection system. This effect is produced by special spacing of the lenses N and P. That is to say, in the instance cited, by making the spacing or separation between the elements a distance of one inch. Such a separation distance is between ½ and ⅓ of the difference of the focal lengths of the positive and negative elements or about 40% of such difference. If I change this separation I change the focal length of the negative. If the separation be increased a point will be reached at which the system has no power at all. Further separation causes it to become positive.

With this lens system I can shorten the equivalent focus of a six inch lens to four and three-quarter inches and leave its back focus practically undisturbed so that it is in effect a long back focus four and three-quarter inch lens equivalent to the back focus of the six inch lens.

As a result, I can make a six inch lens which would in normal projection cover a seventeen and one-half foot screen, cover a twenty-four foot screen without re-focusing or other delay.

This is of vital importance where sound devices are involved for while the loss of a few feet of film or a few seconds of time are relatively unimportant in a silent picture, the result is disastrous where synchronism is disturbed in the slightest.

In such a system as I have indicated in Fig. 1, the projector lens O may be considered as an ordinary six inch projector which at approximately 150 feet would give say a seventeen foot intercept. In this the back focus would be six inches. If now the wide angle system X be interposed in the path of the beam with the values above indicated, the equivalent back focus in projection would be slightly reduced. The same would hold true if the same principles were embodied in the photographing system.

This is indicated in Fig. 3 in which the respective lenses are indicated as before. When combined with the auxiliary X the light path is generally as indicated by the broken lines.

It will be noted that the positive and negative lenses indicated generally at P and N, even though they were of absolutely neutralizing powers would have their joint or resultant nodal points (principal planes) so displaced that when they became combined with the optics O the second principal point A of O is moved back to say $A^1$ but without substantially changing the back focus. This gives the corrective effect heretofore only attainable by changing the back focus. In the form shown in Fig. 1 the auxiliary system is mounted on a yoke Z pivoted so as to swing into or out of alignment.

In the form shown in Fig. 2, the wide positive $P^1$ and the negative $N^1$ of wide angle system are placed on opposite sides of the usual lens system X being mounted in a yoke Z so as to be movable into or out of alignment with projection from the film F.

I am thus able to provide a negative factor which will be sufficiently versatile to be useable with the positive projection systems of different moving picture machines which might vary very considerably in their optical makeup. This it will be seen is quite different from a single negative in the form of a single lens, plano-concave or bi-concave, which cannot be used for two reasons. First, it would change the back focus of any positive projection system and this I avoid by making it of a positive and negative element which substantially neutralize, leaving it of such slight negative value as not to modify the back focus. In the second place, the second principal plane of the combined positive and negative is not at all where it would be in the case of a single negative lens, plano-concave or biconcave, with the same power. That is, the second principal plane lies some hundred millimeters forward of the system X. The position of this principal plane of the system is due to the amount of separation between the positive and negative which shifts the combined principal plane of the two to this considerable distance. Putting it another way, the negative lens has a second principal plane which is about 1 mm. forward of the inner surface. The positive has a second principal plane a little way in advance of the front surface. If the negative and positive were placed in contact the combined principal plane would be somewhere in the general locus of the two lenses. The amount of separation between the positive and the negative as above stated disposes the combined principal plane of the two at about 400 mm. which for the average projection positive of the image will give the desired effect in the change of the focal length of the projector without change of the back focus.

In Figs. 4 to 7, inclusive, I have attempted to illustrate the optical principles involved in each element and in the combined system. This illustration is purely illustrative as my invention may be variously embodied in optics of various design and may be combined in various combinations to produce the desired effect.

What I therefore claim and desire to secure by Letters Patent is:

1. In a rear projection system, the combination of a picture aperture, a lens system consisting of substantially neutralizing auxiliary positive and negative lenses in combination with an adjacent positive projecting system, said positive and negative lenses being spaced apart at a distance less than the focal length of the positive system, and the positive of the substantially neutralizing positive and negative lens pair being disposed nearer the objective than its neutralizing negative.

2. In wide angle optics, a lens system, consisting of substantially neutralizing positive and negative lenses of slightly different focal length in combination with an adjacent positive system, said positive and negative lenses being spaced apart a distance less than the difference between the focal lengths of the positive and negative lenses, and the positive of the substantially neutralizing positive and negative lens pair being disposed nearer the objective than its neutralizing negative.

3. An auxiliary lens system for wide angle projection, consisting of substantially neutralizing auxiliary positive and negative lenses for combination with an adjacent positive projecting system and picture aperture, said positive and negative lenses being spaced apart at a distance less than the focal length of such a positive system, and the positive of the substantially neutralizing positive and negative lens pair being disposed nearer the objective than its neutralizing negative.

4. An auxiliary lens system for wide angle optics, consisting of substantially neutralizing positive and negative lenses of slightly different focal length adapted for combination with an adjacent positive system, said positive and negative lenses being spaced apart a distance less than the difference between the focal lengths of the positive and negative lenses, and the positive of the substantially neutralizing positive and negative lens pair being disposed nearer the objective than its neutralizing negative.

5. In wide angle optics, a lens system consisting of substantially neutralizing positive and negative lens pair in combination with an adjacent positive system, said positive and negative pair being relatively spaced at less than the difference of the focal lengths of its positive and negative lenses, and less than the focal length of the positive system, and the positive of the substantially neutralizing positive and negative lens pair being disposed nearer the objective than its neutralizing negative.

WALTER G. WOLFE.